(12) United States Patent
Yasue

(10) Patent No.: US 6,339,807 B1
(45) Date of Patent: Jan. 15, 2002

(54) MULTIPROCESSOR SYSTEM AND THE BUS ARBITRATING METHOD OF THE SAME

(75) Inventor: Masahiro Yasue, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/310,942

(22) Filed: May 13, 1999

(30) Foreign Application Priority Data

May 14, 1998 (JP) ............................................. 10-131842
Mar. 19, 1999 (JP) ............................................. 11-075795

(51) Int. Cl.[7] .......................... G06F 12/00; G06F 13/14
(52) U.S. Cl. ........................ 710/240; 710/107; 710/109; 710/111; 710/113; 710/114; 710/115; 709/208; 709/211; 709/213; 709/214; 712/11; 712/15; 712/25; 712/28; 712/32; 712/33
(58) Field of Search .................................. 712/1, 25, 11, 712/15, 28, 32, 33, 38, 39; 709/208, 211, 213, 214; 710/107, 111, 109, 113, 114, 115, 116, 123, 122, 240–244

(56) References Cited

U.S. PATENT DOCUMENTS

| | | | | |
|---|---|---|---|---|
| 5,168,568 A | * | 12/1992 | Thayer et al. ............... | 395/725 |
| 5,237,567 A | * | 8/1993 | Nay et al. ................... | 370/438 |
| 5,528,767 A | * | 6/1996 | Chen .......................... | 710/113 |
| 5,555,413 A | * | 9/1996 | Lohman et al. ............. | 710/260 |
| 5,581,777 A | * | 12/1996 | Kim et al. ..................... | 712/16 |
| 5,754,877 A | * | 5/1998 | Hagersten et al. ............ | 712/29 |
| 5,805,839 A | * | 9/1998 | Singhal ....................... | 710/112 |
| 5,996,037 A | * | 11/1999 | Emnett ....................... | 710/117 |

* cited by examiner

Primary Examiner—Rupal Dharia
(74) Attorney, Agent, or Firm—Rader, Fishman & Grauer PLLC; Ronald P. Kananen

(57) ABSTRACT

An arbitrator provided to a processor element requests the utilization of a bus sends a bus request signal and a bus request value according to a priority level of the processor element to the bus, determines the priority of utilizing the bus in accordance with utilizing situation of the bus and the priority level of the processor element. Since a common bus arbitrating circuit connected to the bus watches the bus and determines a processor element to utilize the bus according to the utilizing situation of the bus and the priority level of the processor elements requesting the utilization of the bus, the bus arbitration can be performed with high speed, and an increase of communication speed between the processor elements through a single bus can be realized.

27 Claims, 9 Drawing Sheets

MULTIPROCESSOR SYSTEM AND THE BUS ARBITRATING METHOD OF THE SAME

BACKGROUND OF THE INVENTION

1. Field of the Invention

The present invention relates to a multiprocessor system having a plurality of processor elements commonly using a single bus and a bus arbitrating method for determining a priority of utilizing the bus of the multiprocessor system.

2. Description of the Related Art

The multiprocessor system shown in FIG. 7 is a multiprocessor system having a single bus. In this system, since only a single communication can be carried out at one time, a selecting mechanism, for example, an arbitrating circuit for selecting only one processor element (PE) to use the bus 10 is necessary. Further, to use the bus more effectively, a method for assigning the priority dynamically rather than assigning constant priority to each processor element during the arbitrating is introduced. In this case, for example, the bus assignment by a priority level is effective.

So far, there are two types of arbitrating circuits, the concentration type and the distribution type. A concentration type arbitration circuit, as shown in FIG. 8, for example, is constituted by a plurality of processor elements 12, 22, 32 and an arbitrator 40.

In the concentration type arbitrating circuit, bus request signals are sent by the processor elements request the utilization of the bus directly or indirectly to the arbitrator 40, and then a permission signal from the arbitrator 40 is returned to the processor element that is permitted to use the bus: That is, in a concentration type arbitrating circuit, after three processes of sending a bus request signal by a processor element, selecting a processor element by the arbitrator and transmitting a permission signal from the arbitrator, the processor element requiring to use the bus is first permitted to use the bus.

An example of a distribution type arbitrating circuit is shown in FIG. 9. As illustrated, the distribution type arbitrating circuit is constituted by a plurality of processor elements 12, 22, 32 connected to the bus 10. Further, arbitrators 11, 21, 31 for arbitrating priorities of utilizing the bus is provided to each processor element.

In the distribution type arbitrating circuit illustrated in FIG. 9, permission signals can be generated in a plurality of places (usually by arbitrators of each processor element). In the arbitrating circuit, for the purpose of arbitrating according to the priority levels, each arbitrator needs to hold the priority levels of every processor element. Further, if the priority level of a single processor element is changed, it is necessary to notify the changing to every processor element.

By this kind of distribution type arbitrating circuit, since a processor element can judge directly whether the bus is available or not by the arbitrator provided to it and the bus using is permitted according to the result of the judgment, the time needed from the sending of the bus request signal to the receiving of the bus utilizing permission can be shortened compared with the concentration type of bus arbitrating circuit.

But in the multiprocessor system of the prior art mentioned above, there are demerits of the concentration type and distribution type bus arbitrating circuits, respectively. For example, in a multiprocessor system having a concentration type arbitrating circuit, three processes of sending a bus request signal from a processor element, selecting a processor element by an arbitrator and sending a bus permission signal from the arbitrator are essential. Further, since these three processes which can not be performed simultaneously have to be processed one by one, the time needed for the arbitrating becomes longer.

On the other hand, in a multiprocessor system having a distribution type arbitrating circuit, the arbitration taking use of the priority level is carried out, the arbitrators provided to every processor element have to store the priority levels of every processor element. Further, when the priority level of a single processor element is changed notification to every processor element about the change is necessary. Thus capacity of communication of the whole system must become larger. Furthermore, since each arbitrating circuit has a circuit for selecting processor elements, the scale of each arbitrating circuit becomes larger when a complicated selecting method is utilized hence there is a disadvantage that the scale of the whole system becomes larger.

SUMMARY OF THE INVENTION

The present invention was made in consideration of such a circumstance and has as an object thereof to provide a multiprocessor system and a bus arbitrating method of the same for realizing a system of high speed, shortening the time of bus arbitration without a large increase of the circuit scale.

To achieve the above object, according to an aspect of the present invention, there is provided a multiprocessor system having a plurality of processor elements operating independently and transmitting information through a common bus, comprising: a request value generator generating a bus request value according to a priority level of the processor element when the processor element requests the utilization of the common bus, a transmitter transmitting a bus request signal and the bus request value to the bus when the processor element requests the utilization of the bus, a controlling circuit judging the priority of utilizing the bus according to utilizing situation of the common bus and the bus request value of the processor element transmitting the bus request signal when the processor element transmitted the bus request signal, and a bus arbitrating circuit connected to the bus determining a processor element to utilize the common bus according to the utilizing situation of the bus and the priority levels of the processor elements transmitting bus request signals to the common bus in cases when there is a plurality of processor elements transmitting the bus request signals to the common bus and the controlling circuit can not determine a processor element having priority of utilizing the bus.

Preferably, in the present invention, the request value generator, the transmitting and the controlling circuit are provided to each processor element corresponding to each processor element. Further, there is provided a memory to each processor element storing a priority level data of M ($M \geq 0$, an integer) bits indicating the priority level of the processor element.

Preferably, in the present invention, the request value generator generates the bus request value with at least upper m ($m \leq M$, an integer) bits of the priority level data stored in the memory, and the bit width of the bus is at least of m×N bits in case that there is N ($N \geq 2$, an integer) number of the processor elements connected to the bus.

Preferably, in the present invention, the priority level data of each processor element is variable, and the controlling circuit rewriting the priority level data is in the memory.

Further, according to anther aspect of the present invention, there is provided a method for determining a priority of utilizing a bus for a plurality of processor elements connected to a single bus, said method comprising the steps of: providing a controlling circuit judging the priority of utilizing the bus to each processor element, transmitting a bus request value to the bus according to a bus request signal from the processor element that requests the utilization of the bus and a priority level of the processor element, determining the priority of utilizing the bus for the processor element according to utilizing situation of the bus and the bus request value from the processor element by the controlling circuit provided to the processor element, providing a common bus arbitrating circuit to the bus, and determining a processor element to utilize the bus according to the utilizing situation of the bus and the priority level of the processor elements transmitting the bus request signals to the bus by the bus arbitrating circuit in case when the bus request signals from a plurality of the processor elements is transmitted to the bus and the controlling circuit can not determine a processor element having priority of utilizing the bus.

Preferably, in the method of the present invention, the common bus arbitrating circuit stores the priority level data of every processor element, and when the priority level data of any processor element changes, rewrites the priority level data stored accordingly.

According to the present invention, in the multiprocessor system constituting a plurality of processor elements utilizing a single bus, arbitrators judging the priority of utilizing the bus are provided to each processor element. By the processor element requests to utilize the bus, the bus request signal and the bus request value in accordance with the priority level of the processor element are output to the bus. The arbitrator provided to each processor element judges whether the local processor element can use the bus or not according to the utilizing situation of the bus and the priority level of local processor element when the bus request signal was sent by the local processor element.

Further more, the common bus arbitrating circuit connected to the bus watches the utilizing situation of the bus. When there is a plurality of processor element requested the utilization of the bus, the bus arbitraging circuit determines the processor element to utilize the bus according to the utilizing situation of the bus and the priority level of the processor elements requesting the utilization of the bus and notifies the determination to the processor element. As described above, in the multiprocessor system of the present invention, in case when where is only one processor element requesting the utilization of the bus, the arbitrator provided to the processor element can judge whether the processor element can use the bus or not. While in case when there is a plurality of processor elements requesting the utilization of the bus simultaneously, since the arbitration for determining the processor element to utilize the bus is carried out by the common bus arbitrating circuit connected to the bus based on the priority level of the processor elements requesting the utilization of the bus, the arbitration of the bus can be performed at a high speed.

BRIEF DESCRIPTION OF THE DRAWINGS

These and other objects and features of the present invention will become clearer from the following more detailed description of the related art and description of the preferred embodiments given with reference to the attached figures, in which.

DESCRIPTION OF THE PREFERRED EMBODIMENTS

Figure 1:
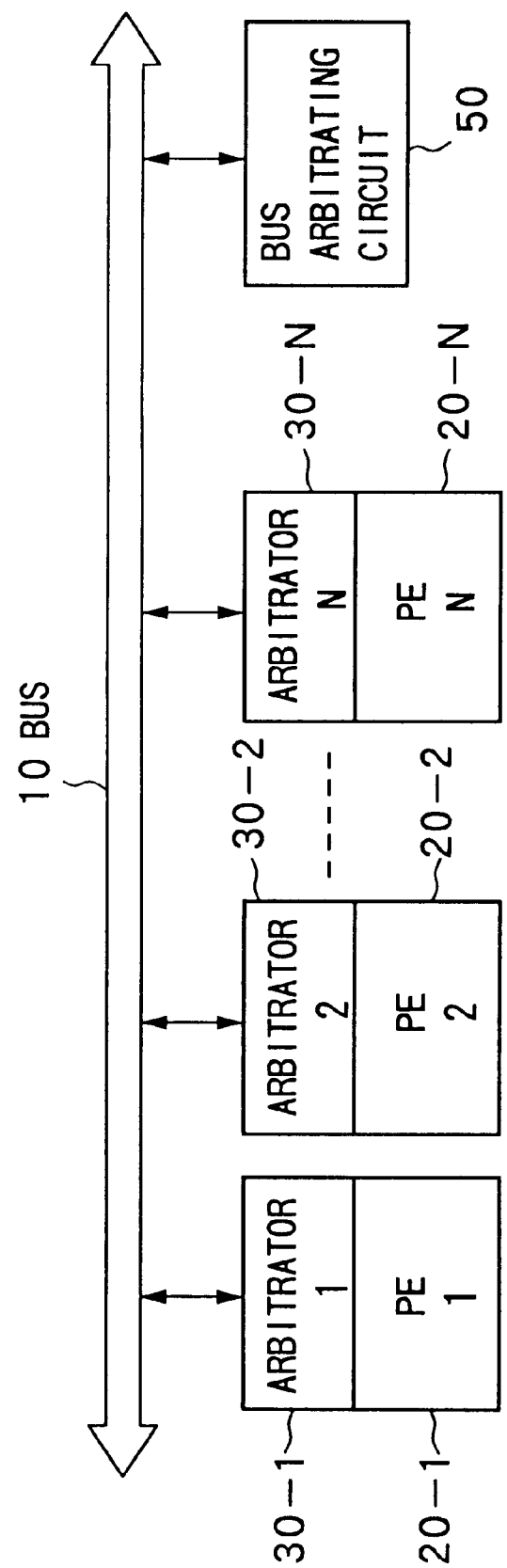
FIG. 1 is a circuit diagram of a multiprocessor system according to an embodiment of the present invention.

FIG. 1 is a circuit diagram of a multiprocessor system according to an embodiment of the present invention.

As illustrated, the multiprocessor system of the present invention is constituted by N number of processor elements (PE) 20-1, 20-2, . . . , 20-N connected to a common bus 10, arbitrators 30-1, 30-2, . . . , 30-N provided to each processor element and a common bus arbitrating circuit 50.

As shown in FIG. 1, in the multiprocessor system of the present invention, the arbitrator 30-1, 30-2, . . . , 30-N are provided to every processor elements 20-1, 20-2, . . . , 20-N. Each processor element holds a priority level which is not constant but variable. The bus arbitrating circuit 50 holds the priority levels of every processor element. When the priority level of a processor element is changed, the value of the corresponding priority level held in the bus arbitrating circuit 50 is changed accordingly.

Figure 2:
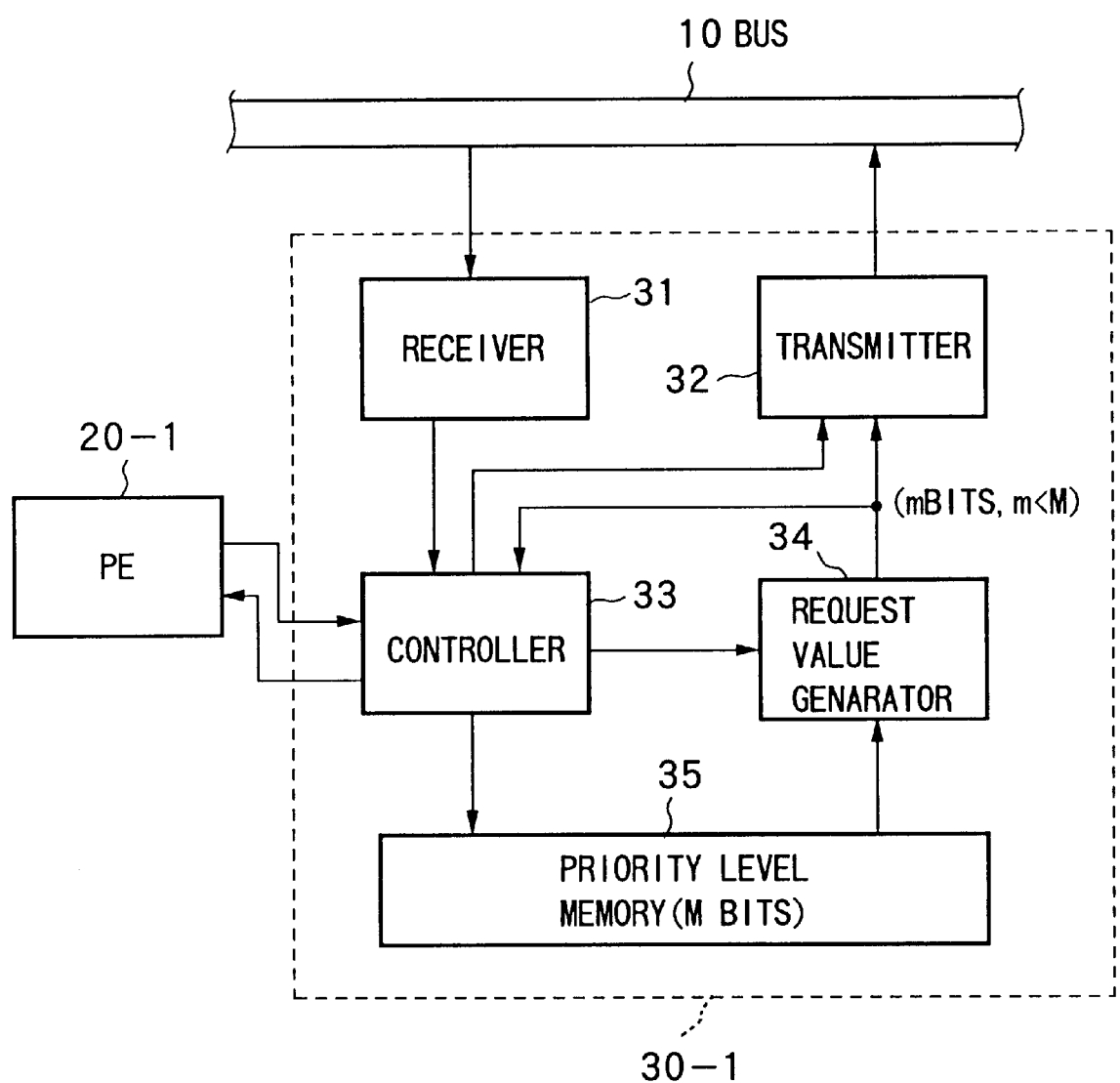
FIG. 2 is a circuit diagram showing a configuration of a arbitrator provided to a processor element.

FIG. 2 illustrates the internal configuration of the arbitrator provided to each processor element. Below, an explanation of the structure and functions of the arbitrator provided to each processor element will be given by referring to FIG. 2.

Since the arbitrators 30-1, 30-2, . . . , 30-N provided to every processor elements 20-1, 20-2, . . . , 20-N shown in FIG. 1 have almost the same structure, for example, the arbitrator 30-1 provided to the processor element 20-1 is depicted in FIG. 2. As illustrated, the arbitrator 30-1 is constituted by a receiver 31, a transmitter 32, a controller 33, a request value generator 34 and a priority level memory 35.

The receiver 31 receives a bus request signal and a bus request value from the bus arbitrator 50 and arbitrators provided to other processor elements through the bus 10, sends the received signal to the controller 33.

When a processor element is going to use the bus 10, the transmitter 32 transmits the bus request signal together with the bus request value generated by the request value generator 34.

The controller 33 asks the request value generator 34 to generate the bus request value, further instructs the transmitter 32 to transmit the bus request signal and the bus request value generated by the request value generator 34 to the bus 10. Then the controller 33 judges whether the processor element 20-1 can utilize the bus 10 or not according to the utilizing situation and the priority level of the processor element 20-1 stored in the priority level memory 35 and notify result of the judgment to the processor element 20-1. Furthermore, the controller 33 rewrites the priority level data stored in the priority level memory 35 according to the instruction from the processor element 20-1 or the instruction signal received by the receiver 31.

The request value generator 34 generates the bus request value according to the priority level data of the processor element 20-1 stored in the priority level memory 35 under the control of the controller 33 when the processor element 20-1 is going to use the bus 10.

The priority level memory 35 stores the priority level data of the processor element 20-1. Here, the priority level data is supposed to be constituted by, for example, M bits of data. Note that the priority level applied to each processor element is not constant but variable. Accordingly, for example, when the priority level of the processor element 20-1 changes, the priority level stored in the priority level memory 35 is also rewritten in response to the instruction of the controller 33. The rewriting of the priority level is carried out according to a rewriting instruction from the processor element 20-1.

Further more, controlling signals instructing setting and rewriting of priority levels of every processor elements are output through the bus 10 by an external controlling equipment, for example, a controlling equipment which controls operations of the whole multiprocessor system. In this case, for example, when an instruction signal instructing the rewriting of the priority level of the processor element 20-1 is received by the receiver 31, the controller 33 rewrites the priority level data stored in the priority level memory 35 according to the instruction signal.

The request value generator 34 generates the bus request value in accordance with the M bit priority level data stored in the priority level memory 35. In detail, for example, the bus request value is generated according to the upper m bits among the M bit priority level data. Here, an explanation will be given by an example in which M=8 and m=2. That is, the priority level data is constituted by 8 bits and the request value generator 34 generates the bus request value by extracting the upper 2 bits from the priority level data and adding a bit of "1" to the lower end of the 2 bit data. For example, in case that the priority level data is "10010001", a bus request value "101" is generated and output.

Figure 3:
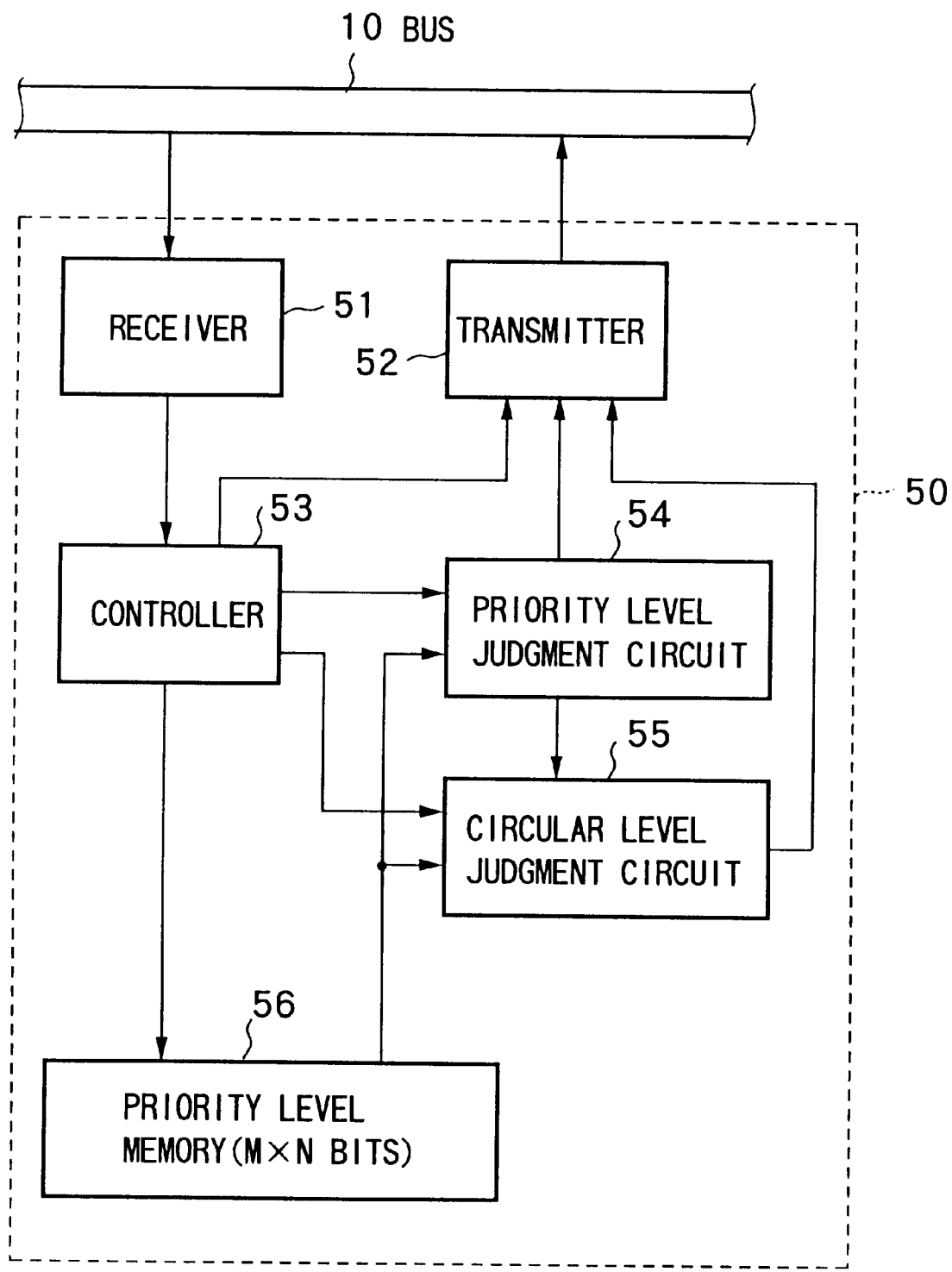
FIG. 3 is a circuit diagram showing a configuration of a common bus arbitrating circuit.

FIG. 3 depicts the configuration of the bus arbitrating circuit 50. Below, an explanation of the structure and functions of the bus arbitrating circuit 50 will be given by referring to FIG. 3. As illustrated, the bus arbitrating circuit 50 is constituted by a receiver 51, a transmitter 52, a controller 53, a priority level judgment circuit 54, a circular level judgment circuit 55 and a priority level memory 56.

The bus arbitrating circuit 50 assigns the bus in accordance with the bus request signals transmitted through the bus 10 and the priority level of each processor element. For example, the bus arbitrating circuit 50 determines a processor element to use the bus according to the bus request signal, bus request value, the priority level of each processor element and the utilizing situation of the bus, sends a bus using permission signal to the permitted processor element through the bus 10.

The receiver 51 receives bus request signals and bus request values sent by arbitrators of processor elements through the bus 10 and applies the received signal to the controller 53. The transmitter 52 transmits the bus using permission signal to the processor element permitted to use the bus 10 according to the judgment result of the priority level judgment circuit 54 through the bus 10.

The controller 53 controls the priority level judgment circuit 54 or the circular level judgment circuit 55 to judge the bus using requests according to the received signal from the receiver 51 when a bus request signal from any processor element is received and to send the using permission signal to the permitted processor element according to the result of the judgment. Further, an instruction signal relating to a rewriting of a priority level is received by the receiver 51 when the priority level of any processor element is rewritten. In this case, the controller 53 rewrites the corresponding priority level data in response to the received signal from the receiver 51.

When the receiver 51 received bus request signals and bus request values from a plurality of processor elements, the priority level judgment circuit 54 determines a processor element with the highest priority among the plurality of processor elements requesting the utilization of the bus according to the priority level data of each processor element stored in the priority level memory 56 under the control of the controller 53, and sends a bus using permission signal to the determined processor element by the transmitter 52. Note that, when there are more than two processor elements having the highest priority among the plurality of the processor elements requesting the utilization of the bus, the priority level judgment circuit 54 notifies the situation to the controller 53.

The controller 53 asks the circular level judgment circuit 55 to judge the processor element to be permitted of using the bus in accordance with the circular priority order when the notification is received from the priority level judgment circuit 54. The circular level judgment circuit 55 determines the processor element to use the bus in accordance with the circular priority order and sends the bus using permission to the processor element by the transmitter 52.

The priority level memory 56 stores the priority level data of all processor elements connected to the bus 10. For example, where N number of processor elements connected to the bus 10 and the priority level data consisting of M bits, the priority level memory has a memory capacity of at least M×N bits. The priority level data stored in the memory 56 can be rewritten according to the control of the controller 53. For example, if the priority level data of any processor element changes, when the receiver 51 received a notification signal of the change of the priority level, the controller 53 sends an instruction for rewriting the corresponding priority level data to the priority level memory 56 according to the received signal. The corresponding priority level data stored in the priority level memory 56 is rewritten accordingly.

Figure 4:
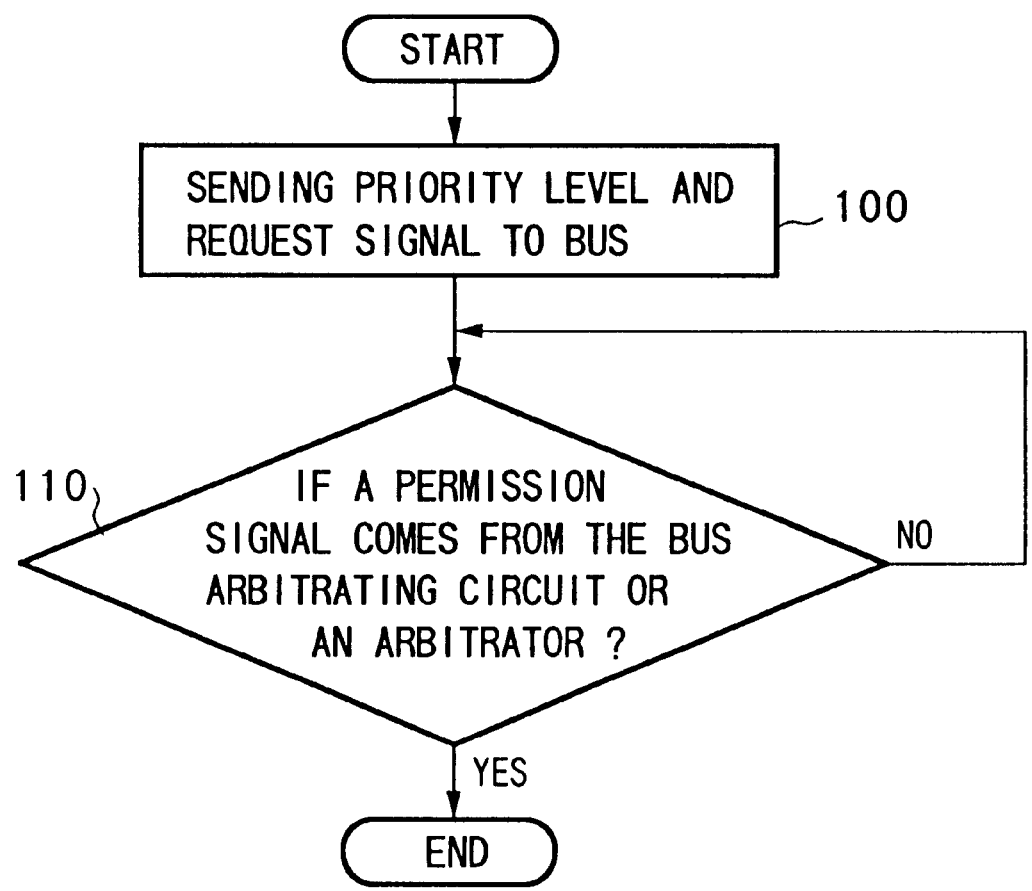
FIG. 4 is a flow chart showing operations of a processor element.
Figure 5:
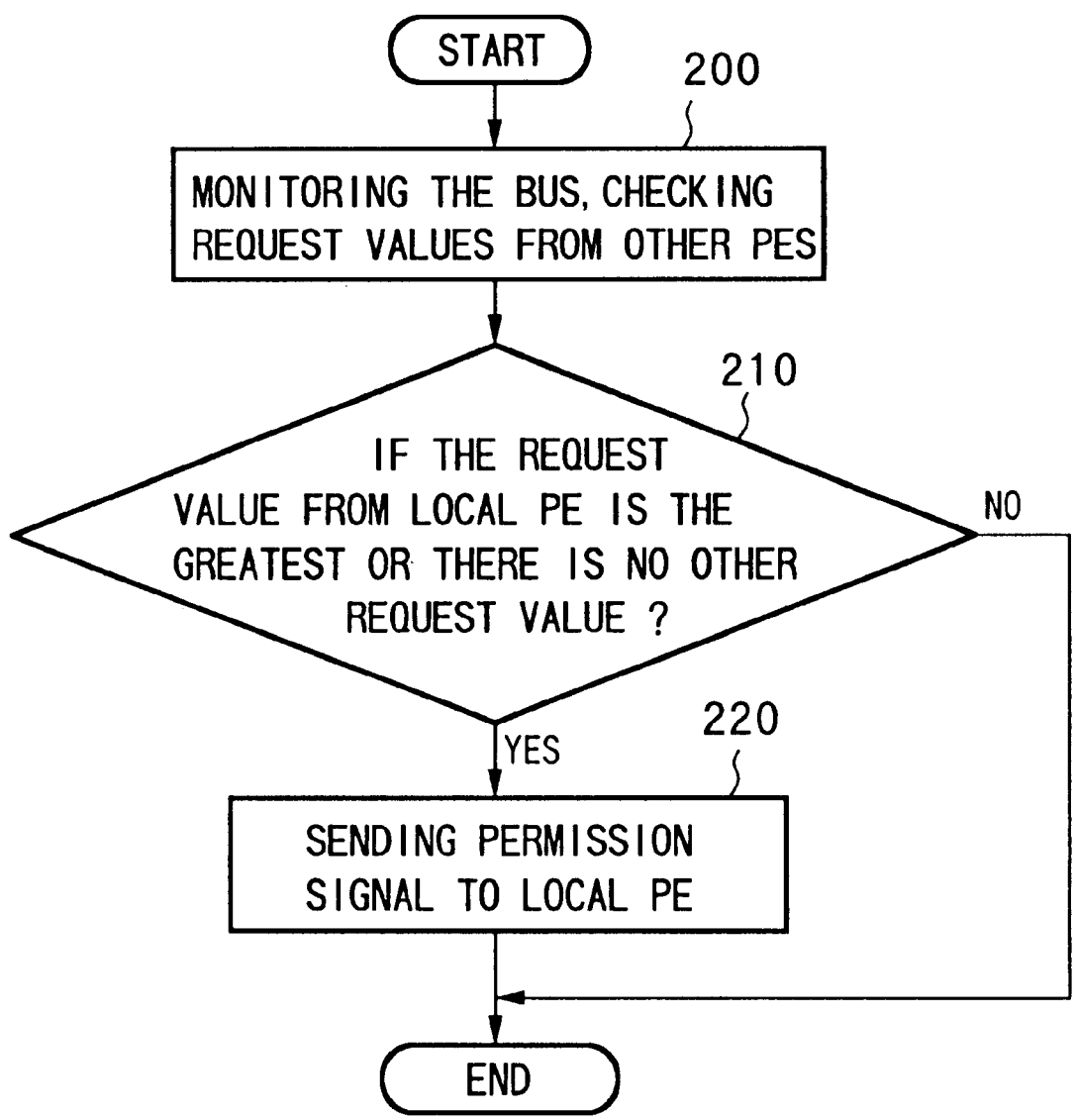
FIG. 5 is a flow chart showing operations of an arbitrator provided to each processor element.
Figure 6:
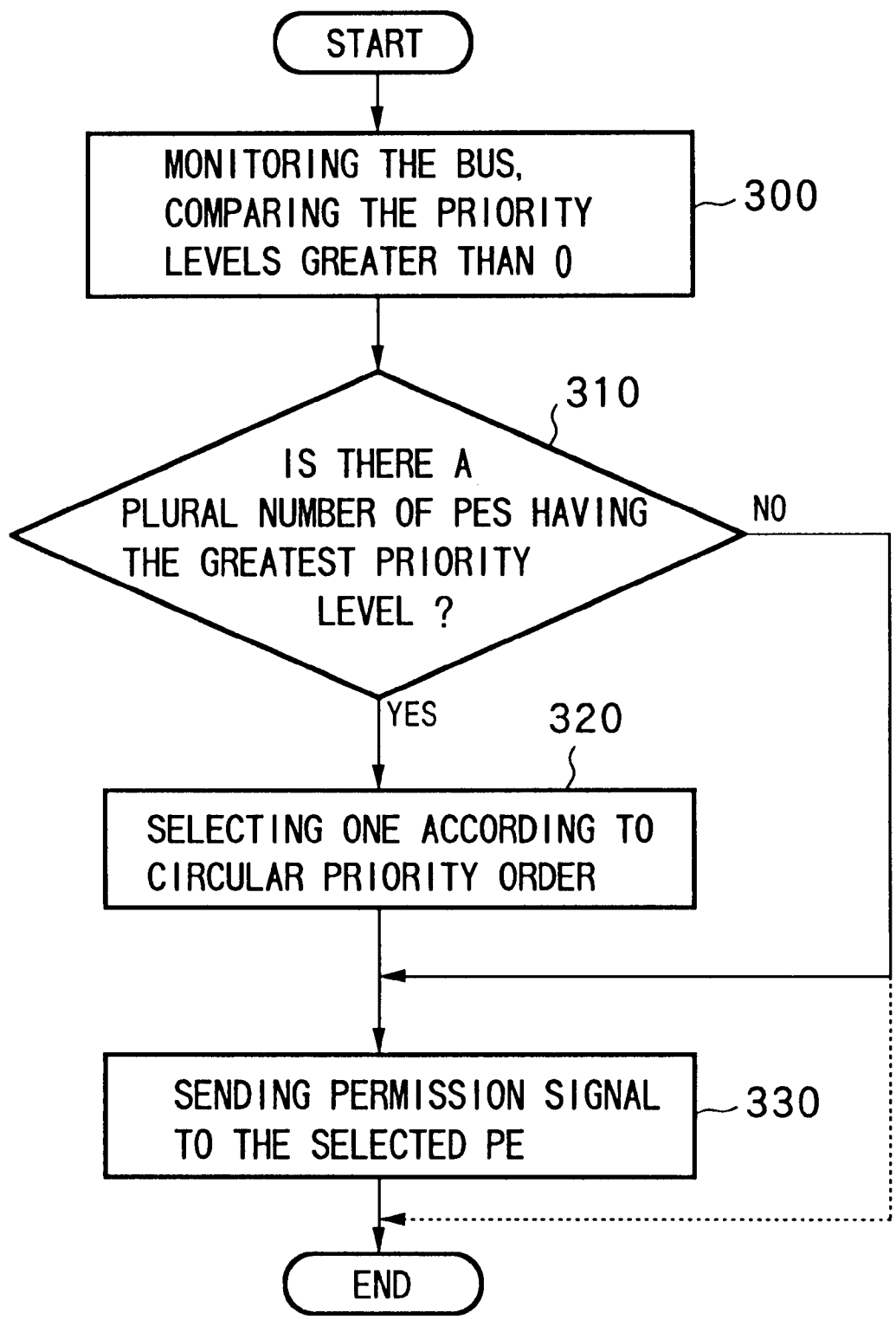
FIG. 6 is a flow chart showing operations of a bus arbitrating circuit.
Figure 7:
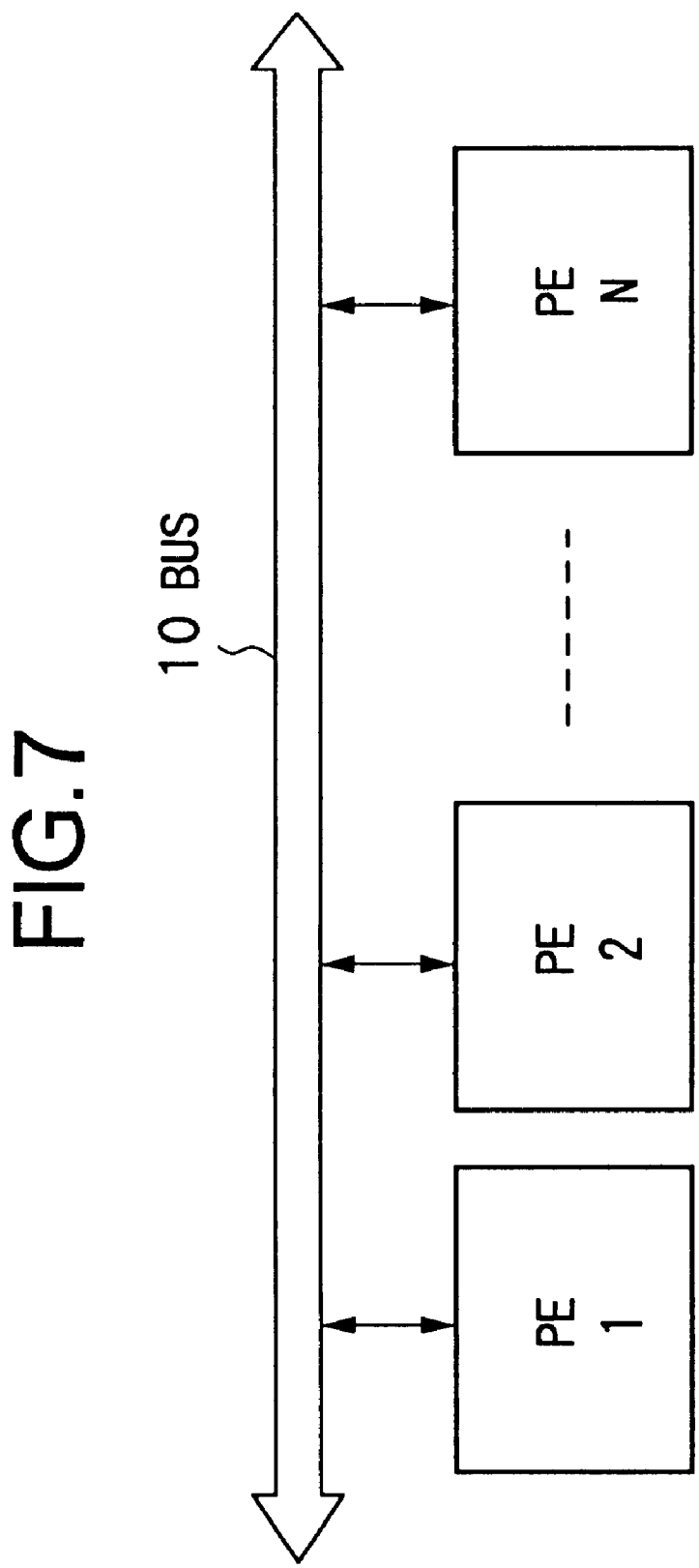
FIG. 7 is a conception diagram showing a configuration of a multiprocessor system having a single bus.
Figure 8:
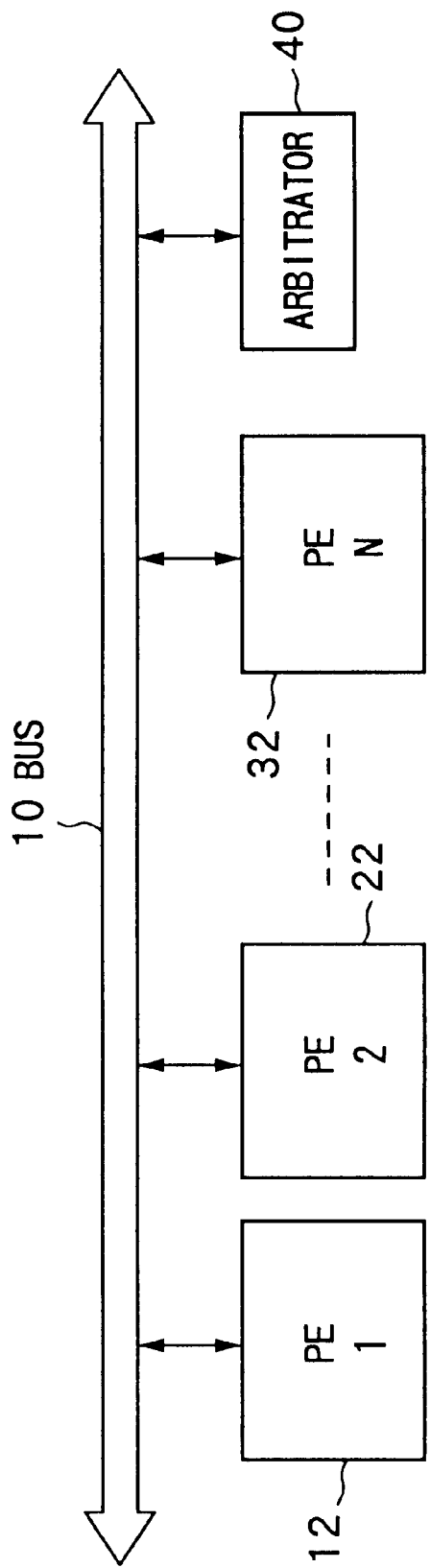
FIG. 8 is a circuit diagram showing an example of a multiprocessor system having a concentration type arbitrating circuit.
Figure 9:
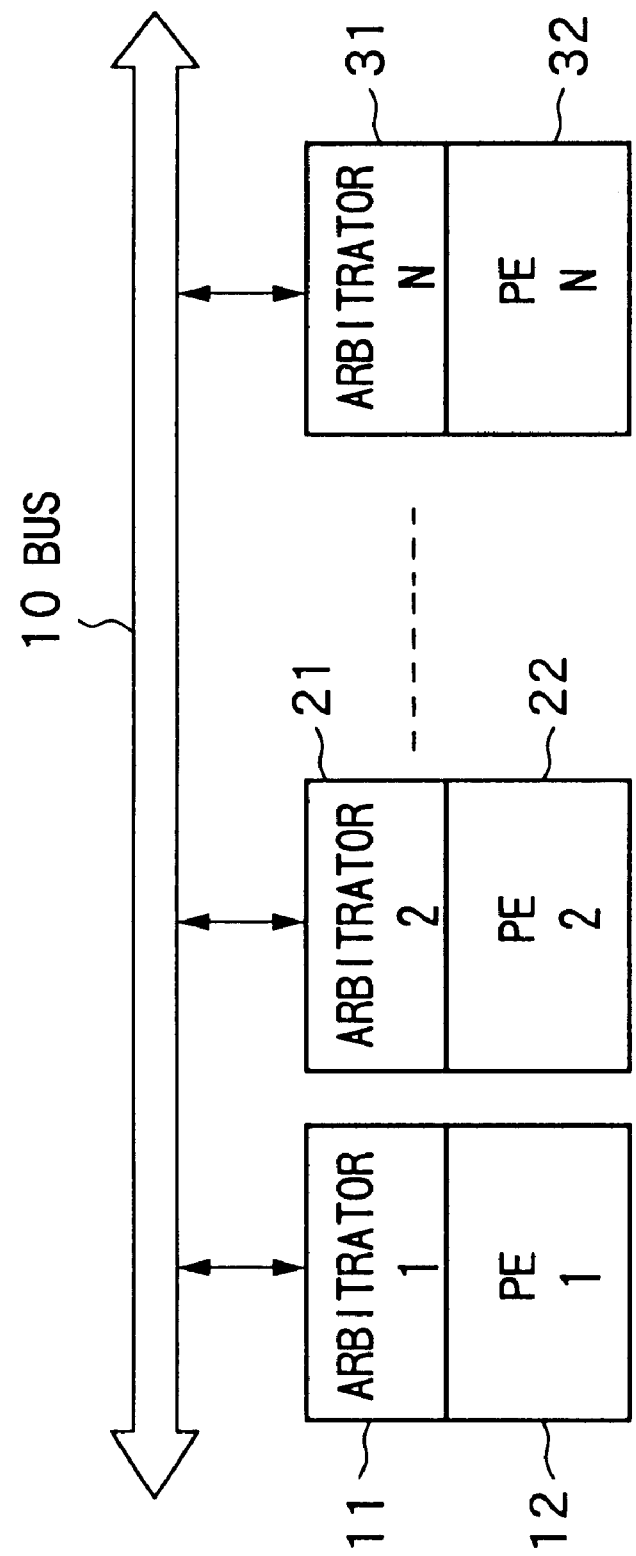
FIG. 9 is a circuit diagram showing an example of a multiprocessor system having a distribution type arbitrating circuit.

FIGS. 4 to 6 are flow charts showing the operations of the processor elements 20-1, 20-2, . . . , 20-N, the arbitrators 30-1, 30-2, . . . , 30-N and the bus arbitrating circuit 50. Below, explanations of the processor elements, the arbitrators and the bus arbitrating circuit 50 will be given by referring to the flow charts.

First, an explanation of the operations of the processor element is given by referring FIG. 4. First, as shown in step 100, the processor element that is going to utilize the bus sends a bus request signal together with a bus request value of 3 bits generated by the upper two bits of an own priority level data and a datum "1" to the bus 10 through the arbitrator provided to the processor element. For example, when the priority level data is "10010001" in binary, a bus request value of "101" is generated by the request value generator 34. Further, the bus request value along with the request signal is sent to the bus 10 by the transmitter 32 of the arbitrator.

Since bus signal lines of exactly the number of the bus request value are assigned to each processor element, the situation that different processor elements send bus request signals with the same signal line can be avoided. That is, supposing that the number of the processor elements is N and the bus request value is constituted by a 3 bit data, the bit width of the bus 10 is at least (N×3). So a plurality of processor elements can send the bus request values to the bus 10 at the same time.

Next, in step 110, the processor element waits for the using permission signal from the bus arbitrating circuit 50 or its own arbitrator. If a permission signal from the bus arbitrating circuit or the arbitrator of its own is received, the processor element can use the bus 10, and the arbitration is finished. Here, the arbitrator of a processor element its own means, for example, in FIG. 1, the arbitrator 30-1 for the processor element 20-1, the arbitrator 20-2 for the processor element 20-2 and the arbitrator 30-N for the processor element 20-N, respectively.

FIG. 5 is a flow chart showing the operations of the arbitrator provided to each processor element. As illustrated, the arbitrator starts operations when its processor element requests utilizing of the bus. Here, the processor element of its own means the processor element 20-1 for the arbitrator 30-1, the processor element 20-2 for the arbitrator 30-2 and the processor element 20-N for the arbitrator 30-N.

First, in step 200, the arbitrator watches the bus 10 and obtains bus request values sent by other processor elements. Then in step 210, the arbitrator investigates whether its own processor element is the only one sending the bus request value, or if the bus request value sent by its own processor element is the greatest among the request values sent by other processor elements. In case that its own processor element is the only one that sending the bus request value, or the bus request value sent by its own processor element is the greatest among the request values sent by other processor elements, by the process of step 220, a using permission signal of the bus 10 is output to the processor element of its own. Otherwise, the process is finished.

FIG. 6 is flow chart showing the operations of the bus arbitrating circuit 50. As illustrated, the bus arbitrating circuit 50 begins to operate when more than one processor elements send bus requests to the bus 10. First, in step 300, the bus arbitrating circuit 50 watches the bus 10, and reads every bus request values sent to the bus 10 by the processor elements. Then the bus arbitrating circuit 50 compares the values of the priority levels greater than 0 sent by processor elements and searches the one with the greatest priority level. In step 310, if there is a plurality of processor elements having the greatest priority level, process of step 320 is carried out, while if there is only one processor element having the greatest priority level, in step 330, a bus using permission signal is sent to the processor element, then the process finishes. At this time, the process can be finished without performing the step 330. That is, in case that there is only one processor element requesting the utilization of the bus, the processor element can get the bus using permission form the arbitrator belongs to the processor element and starts to use the bus 10. So the outputting of the bus using permission again from the bus arbitrating circuit 50 is not essential.

In case when there is a plurality of processor element having the greatest priority level, the process of the step 320 is carried out. In the step 320, one processor element is selected from the processor elements having the greatest priority level in accordance with the circular priority order.

Then in the step 330, the bus using permission signal is sent to the selected processor element and the process finishes. Note that, since the determination of the arbitrator of each processor element takes precedence over the determination of the bus arbitrating circuit 50, the process of the bus arbitrating circuit 50 finishes when any one of the arbitrators outputs the permission signal.

Here, for example, supposing that the priority level data of the processor element 20-1 is "10001000" (in binary), the priority level data of the processor element 20-2 is "01110000" and the priority level data of the processor element 20-N is "11000000", respectively and the three processor elements 20-1, 20-2 and 20-N output bus request signals to the bus 10 at the same time. In this case, each processor element outputs a bus request signal to the bus 10. For example, the processor element 20-1 outputs a request value of "101". The processor element 20-2 outputs a request value of "011" while the processor element 20-N outputs a request value of "111" to the bus 10, respectively. Since the request value of "111" is the greatest among the request values of "101", "011" and "111", and is unique, the arbitrator 30-N provided to the processor element 20-N sends the bus using permission signal to the processor element 20-N in the step 220 as shown in FIG. 5. So the processor element 20-N is able to utilize the bus 10 and the arbitrating process of the arbitrator 30-N is finished.

As explained above, according to the present embodiment, in a multiprocessor system having a plurality of processor elements utilizing a single bus 10 for mutual communication of information, the processor element requesting the utilization of the bus 10 sends a bus request signal and a bus request value according to its own priority level to the bus 10. When a processor element requests the utilization of the bus, the arbitrator provided to the processor element determines whether the processor element can use the bus or not according to the utilizing situation of the bus and the priority level of its own processor element. The bus arbitrating circuit 50 watches the bus 10 and determines the processor element to utilize the bus 10 according to the utilizing situation of the bus and the priority level of the processor element requesting the utilization of the bus when a bus request signal is sent to the bus 10. Accordingly, the determination of the priority of utilizing the bus can be performed quickly and a increase of communication speed in a multiprocessor system utilizing a single bus can be achieved.

Note that, in the example described above, there are only processor elements along connected to the bus 10. The present invention is not limited by that, some other modules beside the processor elements, for example, some units constituting the multiprocessor system, memories can also be connected to the bus.

Further, each processor element holds a priority level, but not all of bits of the data indicating the priority level of the processor elements need to be stored. It is sufficient to store only the number of bits that is needed for generating the bus request value sending to the bus when a processor element requesting the utilization of the bus. For example, as mentioned above in the description of the present embodiment, since the bus request value of a combination of the upper two bits of the priority level data and a bit of "1" is sent to the bus together with the bus request signal when the processor element requests the utilization of the bus, storing at least the upper two bits of the priority level data in each processor element is sufficient.

Furthermore, in the common bus arbitrating circuit 50 connected to the bus 10, where there is a plurality of processor elements having the greatest priority level among the processor elements sending bus utilizing requests, one processor element is selected based on the circular priority order. But the selection can be performed according to same other methods. Further, it is not essential to select the processor element having the greatest priority level, for example, one having apparently the greatest priority level can be selected. Further, the processor element requests the utilization of the bus 10 sends the bus request value of three bits including the upper two bits of its own priority level data to the bus 10, but the number of bits is arbitrary, provided that the bus request value is greater than 0, further having a number of bits that equal to or smaller than that of the priority level data.

Further, the priority level data of each processor element, for example, can be set by the bus arbitrating circuit 50. The bus arbitrating circuit 50 can also send control signals for setting the priority level data to each processor element through the bus 10. Furthermore, each processor element can send a control signal to any one of the processor elements to set the priority level data of the processor element through the bus 10. Further, each processor element can directly set the priority level data of it own. When the priority level data of any processor element changed, the priority level data stored in the bus arbitrating circuit 50 is also changed accordingly. The priority level data can be stored by the arbitrators provided to each processor element. In this case, the processor element requests the utilization of the bus 10 can send the bus request signal and the bus request value in accordance with its own priority level to the bus 10 through the arbitrator.

As explained above, according to the multiprocessor system and the bus arbitrating method of the present invention, since an arbitrator is provided to each processor element, the processor element that is able to use the bus can be determined immediately and be notified when the processor element can be selected uniquely. Thus bus arbitration with high speed can be achieved.

Further, since the processor element utilizing the bus sends a part of the information of the priority level, for the bus request value formed by a part of the priority level data along with sending the bus request signal to the bus the possibility is high that the bus arbitrating circuit will determine which processor element utilizes the bus. Furthermore, by increasing the bit number of the bus request value sent by the processor element, the possibility that the arbitrator provided to each processor element will make a determination gets higher, and the time needed for arbitration can be shortened comparing with determining by the common bus arbitrating circuit.

Since there is provided a common bus arbitrating circuit independent to each processor element, when a complicated arbitration is performed, only the scale of the bus arbitrating circuit gets larger, the influence on the arbitrators of each processor element can be avoided. That is, installation of a bus arbitrating circuit with a complicated algorithm is possible. Further, each arbitrator holds only the priority level data of the corresponding processor element without the necessity to hold the priority levels of every processor element. Since the bus arbitrating circuit holds the priority levels of every processor elements, notification of the change of the priority level only to the bus arbitrating circuit is sufficient when any of the priority levels changed, so that the communication load of the bus decreases.

While the invention has been described with reference to specific embodiments chosen for purposes of illustration, it should be apparent that numerous modifications could be made thereto by those skilled in the art without departing from the basic concept and scope of the invention.

What is claimed is:

1. A multiprocessor system having a plurality of processor elements operating independently and transmitting information through a common bus, comprising:

a request value generator generating a bus request value according to a priority level of the processor element when the processor element requests a utilization of the common bus, said priority level being variable, a transmitter transmitting a bus request signal and bus request value to the bus when the processor element requests the utilization of the common bus, a controlling circuit judging the priority of utilizing the bus according to the utilization situation of the common bus and the bus request value of the processor element transmitting the bus request signal when the processor element transmits the bus request signal, and a bus arbitrating circuit connected to the common bus to determine which processor element will utilize the common bus according to the utilization situation of the bus and the priority levels of the processor elements transmitting bus request signals to the common bus where there is a plurality of processor elements transmitting bus request signals and said controlling circuit can not determine which processor element having priority of utilizing the bus.

2. A multiprocessor system as set forth in claim 1, wherein the request value generator is provided to each processor element corresponding to each processor element.

3. A multiprocessor system as set forth in claim 1, wherein the transmitter is provided to each processor element corresponding to each processor element.

4. A multiprocessor system as set forth in claim 1, wherein the controlling circuit is provided to each processor element corresponding to each processor element.

5. A multiprocessor system as set forth in claim 1, further comprising a memory storing a priority level data of M ($M \leq 0$, a integer) bits in each processor element indicating the priority level of the processor element.

6. A multiprocessor system as set forth in claim 5, wherein the request value generator generates the bus request value with at least upper m ($m \leq M$, a integer) bits of the priority level data s to red in the memory.

7. A multiprocessor system as set forth in claim 6, wherein the bit width of the bus is at least of m×N bits in case that there is N ($N \geq 2$, a integer) number of the processor elements connected to the bus.

8. A multiprocessor system as set forth in claim 5, wherein the controlling circuit rewrites the priority level data stored in the memory.

9. A multiprocessor system as set forth in claim 1, wherein the bus arbitrating circuit further comprises a priority level judgment circuit judging which processor element is to utilize the bus according to the priority levels of every processor element transmitting the bus request signals when the bus request signals of a plurality of processor elements received.

10. A multiprocessor system as set forth in claim 1, wherein the bus arbitrating circuit comprising a memory storing the priority level data of every processor elements connected to the bus.

11. A multiprocessor system as set forth in claim 10, wherein the bus arbitrating circuit further comprises a controlling circuit rewriting the priority level data stored in the memory.

12. A bus arbitrating method for determining a priority of utilizing a bus for a plurality of processor elements connected to a single bus, said method comprising the steps of:
providing a controlling circuit judging the priority of utilizing the bus to each processor element,
transmitting a bus request value to the bus according to a bus request signal from the processor element that requests a utilization of the bus and a priority level of the processor element, said priority level being variable,
determining the priority of utilizing the bus for the processor element according to the utilization situation of the bus and the bus request value from the processor element by the controlling circuit provided to the processor element,
providing a common bus arbitrating circuit to the bus, and
determining which processor element to utilize the bus according to the utilizing situation of the bus and the priority level of the processor elements transmitting the bus request signals to the bus by the bus arbitrating circuit in case when the bus request signals from a plurality of the processor elements is transmitted to the bus and the controlling circuit can not determine a processor element having priority of utilizing the bus.

13. A bus arbitrating method as set forth in claim 12, wherein the priority level data of each processor element is variable and is changed in response to a instructing signal from an external circuit or from a processor element.

14. A bus arbitrating method as set forth in claim 12, wherein the bus arbitrating circuit stores priority level data of every processor element.

15. A bus arbitrating method as set forth in claim 12, wherein when any of the priority level data of the processor element is changed, the bus arbitrating circuit changes the priority level data stored accordingly.

16. A multiprocessor system comprising:
a plurality of processor elements, each processor element of said plurality of processor elements having a priority level and operating independently from another processor element of said plurality of processor elements, said priority level being variable; and
a plurality of arbitrators, each arbitrator of said plurality of arbitrators being correspondingly associated with said each processor element, said each arbitrator including:
arbitrator priority level memory, said arbitrator priority level memory storing said priority level as priority level data, said priority level data being rewritten when said priority level is varied;
an arbitrator request value generator, said arbitrator request value generator generating a bus request value and a bus request signal, said bus request value being generated from said priority level data;
an arbitrator controller, said arbitrator controller prompting said arbitrator request value generator to generate said bus request value, determining whether said each processor element can use said common bus, and notifying said each processor element if said common bus is available for use; and
an arbitrator receiver, said arbitrator receiver receiving said bus request signal and said bus request value from a bus arbitrator, receiving said bus request signal and said bus request value from another arbitrator of said plurality of arbitrators, and sending said received bus request signal from said bus arbitrator and said another arbitrator to said arbitrator controller; and
said arbitrator transmitter, said transmitter transmitting said bus request signal and said bus request value to said common bus, said controller instructing said arbitrator transmitter to transmit said bus request signal and said bus request value to said common bus.

17. The multiprocessor system of claim 16, wherein said bus arbitrating circuit further comprises:
a bus arbitrating receiver, said bus arbitrating receiver receiving said bus request signal sent by said each arbitrator, and receiving said bus request value being sent by said each arbitrator;
bus arbitrating priority level memory, said bus arbitrating priority level memory storing said priority level data of any processor element of said plurality of processor elements that are connected to said common bus;
a bus arbitrating priority level judgement circuit, said bus arbitrating priority level judgement circuit determining a highest priority processor element from among said plurality of processor elements requesting use of said bus according to said priority level data of said each processor element stored in said bus arbitrating priority level memory, and generating a conflict notification when two or more processor elements of said plurality of processor elements are determined to each have the highest priority, and generating a priority bus using permission;
a bus arbitrating circular level judgement circuit, said bus arbitrating circular level judgement circuit determining a highest priority processor element from among said plurality of processor elements requesting use of said bus according to said priority level data of said each processor element in according to a circular priority order, and generating a circular bus using permission;
a bus arbitrating controller, said bus arbitrating controller controlling said bus arbitrating priority level judgment circuit to establish said priority bus using permission as a bus using permission when said conflict notification is not generated, and controlling said bus arbitrating circular level judgment circuit to establish said circular bus using permission as said bus using permission when said conflict notification is generated; and
a bus arbitrating transmitter, said bus arbitrating transmitter transmitting said bus using permission signal to said highest priority processor element, said bus using permission signal indicating that said highest priority processor element is permitted to use said common bus.

18. The multiprocessor system of claim 17, wherein said arbitrator controller rewrites said priority level data stored in said arbitrator priority level memory and said bus arbitrating controller correspondingly rewrites said priority level data stored in said bus arbitrating priority level memory.

19. The multiprocessor system of claim 16, wherein said bus request value is generated from said priority level data having a length of "M" bits, the uppermost "m" bits of said priority level data being the most significant bits of said bus request value, a bit value of "1" being appended to said "m" bits as the least significant bit of said bus request value, "M" and "m" being integers, and "M" being greater than or equal to "m".

20. The multiprocessor system of claim 19, wherein said arbitrator priority level memory has a memory capacity of at least "M" times "N" bits, "N" being the number of processor elements of said plurality of processor elements connected to said common bus.

21. The multiprocessor system of claim 16, wherein said bus request value is generated when said each processor element is to use said common bus.

22. The multiprocessor system of claim 16, wherein said bus request signal and said bus request value are transmitted to said common bus when said each processor element is to use said common bus.

23. The multiprocessor system of claim 16, wherein said arbitrator controller rewrites said priority level data stored in said arbitrator priority level memory.

24. The multiprocessor system of claim 23, wherein said priority level data is rewritten according to the instruction from said each processor element.

25. The multiprocessor system of claim 24, wherein said priority level data is rewritten according to an instruction from said arbitrator receiver.

26. A method for arbitrating usage of a common bus from among a plurality of processor elements and a plurality of arbitrators, each processor element of said plurality of processor elements having a priority level, and each arbitrator of said plurality of arbitrators being correspondingly associated with said each processor element, said method comprising:

storing said priority level as priority level data;

generating a bus request value and a bus request signal, said bus request value being generated from said priority level data;

determining whether said each processor element can use said common bus;

notifying said each processor element if said common bus is available for use;

receiving said bus request signal and said bus request value from a bus arbitrator, receiving said bus request signal and said bus request value from another arbitrator of said plurality of arbitrators;

transmitting said bus request signal and said bus request value to said common bus.

27. The method of claim 26 further comprising:

generating said bus request value is from said priority level data having a length of "M" bits, the uppermost "m" bits of said priority level data being the most significant bits of said bus request value, a bit value of "1" being appended to said "m" bits as the least significant bit of said bus request value, "M" and "m" being integers, and "M" being greater than or equal to "m".

* * * * *